2 Sheets—Sheet 1.

J. O. MORSE.
Pipe-Cutter and Screw-Former.

No. 212,255.      Patented Feb. 11, 1879.

Witnesses  
W. L. Bennent  
A. A. Courter

Inventor.  
James Otis Morse  
by his atty.  
C. S. Renwick

J. O. MORSE.
Pipe-Cutter and Screw-Former.
No. 212,255.  Patented Feb. 11, 1879.
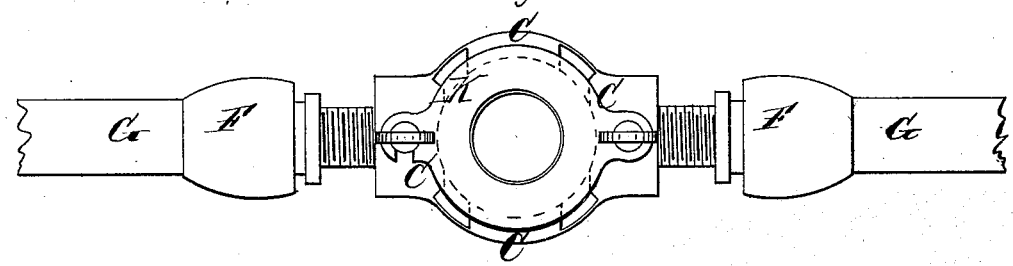
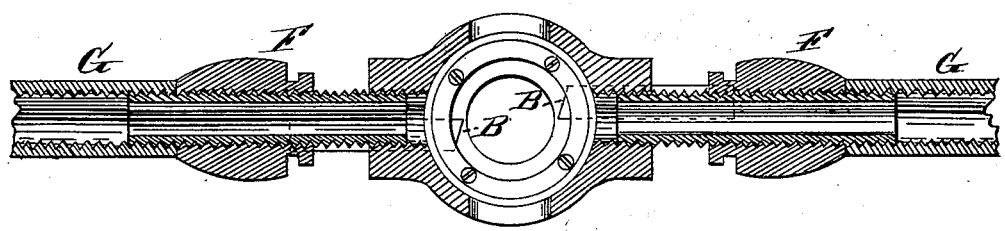
Witnesses
H. L. Bennett.
C. A. Courter
Inventor:
James Otis Morse
by his Atty.
C. S. Renwick

UNITED STATES PATENT OFFICE.

JAMES O. MORSE, OF ENGLEWOOD, NEW JERSEY.

IMPROVEMENT IN PIPE-CUTTER AND SCREW-FORMER.

Specification forming part of Letters Patent No. 212,255, dated February 11, 1879; application filed September 20, 1878.

*To all whom it may concern:*

Be it known that I, JAMES OTIS MORSE, of Englewood, in the county of Bergen and State of New Jersey, have made an Invention of a Combined Pipe Cutter and Screwer; and that the following is a full, clear, and exact description and specification of the same, reference being had to the accompanying drawings.

The object of the invention which constitutes the subject of the present patent is to enable gas and other pipes to be readily cut to lengths, and to have their ends screwed after cutting by the use of a single implement, and with great facility and accuracy.

To this end my invention consists of certain combinations of mechanical devices, which are recited in the claims at the close of this specification.

In order that the invention may be fully understood, I have represented in the accompanying drawings, and will proceed to describe, a compound pipe cutter and screwer embodying my invention.

Figure 1:
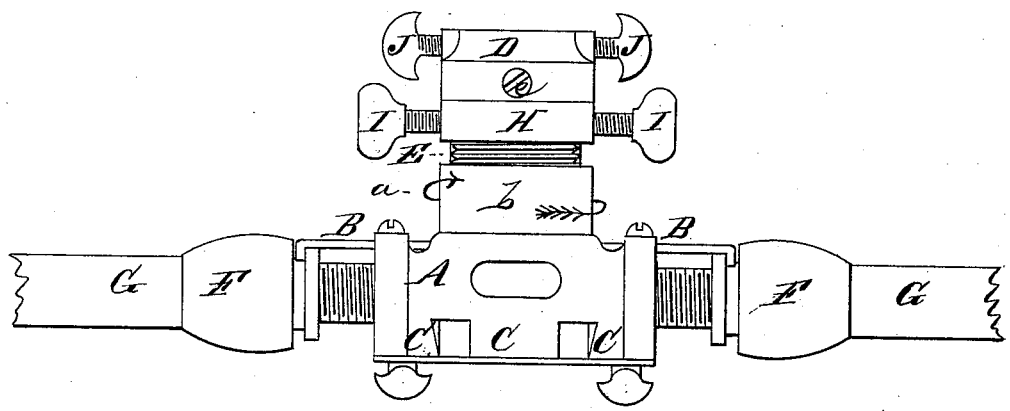
Figure 2:
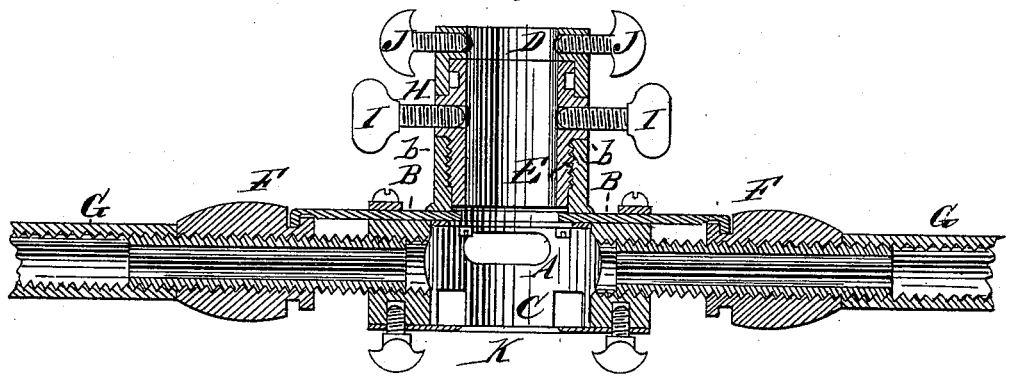

Figure 1 of said drawings represents a side view of the implement. Fig. 2 represents a central section of the same. Fig. 3 represents a face view of the implement. Fig. 4 represents a transverse section of it through the axes of the handles.

The principal members of the said implement are the stock A; the slitting tool or tools B B, for cutting the pipe; the projections C, for holding a screw-die, by which the pipe may have a screw-thread cut upon it; the clamp-guide collar D, for holding the implement from moving longitudinally along the pipe, but with the capacity of the free rotation of the stock and cutters during the cutting of the pipe; and the leading-screw E, for leading the screw-threads of the die longitudinally along the pipe while the screw-thread is being cut thereon.

The stock A is hollow, so that it can be slipped upon the pipe to be cut, and it is fitted at opposite sides of its cavity with two movable slitting cutters or tools, B B, whose shanks are constructed to be slid radially in slots, so that the tools can be advanced toward the center of the implement and the pipe therein during cutting.

In order that the slitting-tools may be fed or advanced against the pipe, the outer end of the shank of each is connected with a nut-handle, F, which is screwed upon screw-threads formed upon the lever-handle G, by which the stock is turned upon the pipe, the nut-handle being thus in a convenient position for the operator, and the screw-thread upon the lever-handle forming a feed-screw for advancing the slitting-tool radially.

The butt *b* of the stock A has a hollow screw cut in it of the same pitch as the pitch of the screw-die to be used in the implement. This hollow screw screws upon the leading-screw E, which is of the same pitch, and which protrudes from a collar, H. The leading-screw collar is fitted with two clamp-screws, I I, by means of which it may be clamped fast to the pipe to be screwed.

The butt of the leading-screw collar H is connected with a clamp-guide collar, D, by means of two screws, *e*, whose points are received in a ring-groove of the leading-screw collar, so that the latter, with the stock and its cutters, may be turned upon the clamp-guide collar, but without longitudinal movement along the pipe.

The clamp-guide collar D is provided with two clamp-screws, J J, by means of which the former may be secured to the pipe to be cut.

The front end of the stock A is provided with projections C, which form a die-cavity, (represented in dotted lines in Fig. 3,) in which the screw-die for screwing the pipe can be inserted, and this cavity is covered with a removable cap, K. The projections C compel the die to turn with the stock, and the cap holds the die in place; but, if deemed best, other means may be used for securing the screw-die to the stock—such as two bolts or studs passing through perforations of the die and fitted at their outer ends with heads or nuts.

When a pipe is to be cut and screwed by means of the implement as above described, the latter is adjusted for use by moving back the slitting-cutters by means of their nut-handles F, and by screwing the leading-screw collar tight up against the butt of the stock, as represented in Fig. 2. The implement is then slipped upon the pipe until the cutters are at the place where the pipe is to be cut. The clamp-guide collar D is then made fast to the pipe by screwing in the clamp-screws J J, and the stock is turned in the direction of the arrow a, Fig. 1, to cut the pipe, the nut-handles F F being turned forward at intervals between the turning of the stock to feed the points of the slitting-cutters against the pipe. The turning of the implement, as above described, in the direction of the arrow, tends to screw up the leading-screw, and as this was done to the fullest extent before commencing work the leading-screw is temporarily inoperative, and the implement is held longitudinally of the pipe by the clamp-guide collar D, which, however, permits it to turn freely circumferentially of the pipe, so that the slitting-cutters travel truly around the pipe, forming a ring-groove, until the pipe is cut in two. When the cutting has been thus effected, the clamp-guide collar D is unclamped, the nut-handles F F are turned to withdraw the slitting-cutters, and the leading-screw collar H is turned to unscrew the leading-screw several threads—say, three or four, as represented in Fig. 1. The screw-die is then put in place in the implement, and the tool is set with the inner face of the screw-die bearing against the end of the pipe. The leading-screw collar H is now clamped fast to the pipe by tightening its clamp-screws I I, whereupon the turning of the implement in the direction of the arrow a, Fig. 1, leads the screw-die truly upon the end of the pipe, and causes the die to screw the same. As soon as the screwing or screw-cutting of the pipe has been advanced about three turns of the screw, the leading-screw collar H may be unclamped, and the rest of the screw may be cut by the implement by the use of the screw-die without the use of the leading-screw, because the screw-threads first cut by the die (with the help of the leading-screw) will guide it for the rest of the work. If, however, the operator prefers to continue to use the leading-screw, he may unscrew the leading-screw collar several threads and reclamp it to the pipe before recommencing the work of turning the implement to advance the screwing, and may then proceed as before. The bore of the guide and leading-screw collars should be such as to slip easily over the size of pipe for which the implement is designed; but the same implement may be used to cut and screw several sizes of pipe by providing it with removable bushes, one of which, having a bore suitable for the pipe to be operated upon, may be inserted in the bore of the implement. In such case, however, the bush should be perforated radially with holes corresponding with those of the clamp-screws of the collars, so that these screws can be screwed through the bush against the pipe when either collar is to be clamped thereto.

If preferred, the leading-screw may be made to project from the butt of the stock of the implement, and the nut or hollow screw may be formed in the leading-screw collar. The means of connecting the clamp-guide collar, also, may be varied, and other clamping devices may be substituted for the clamp-screws of the guide-collar and leading-screw collar.

If preferred, the relative positions of the leading-screw collar and clamp-guide collar may be transposed; but in such case the clamp-guide collar and stock should be clamped together during the screwing of the pipe, so as to be drawn simultaneously along the pipe by the leading-screw when the implement is turned. In this case there is no absolute necessity for clamping the guide-collar to the pipe by its own clamp-screws during the cutting of the pipe, as the clamp-screws of the leading-screw collar will hold both collars, provided the leading-screw be screwed up tightly and the implement be turned in a forward direction for cutting.

Instead of arranging the slitting-cutters so that the nut-handles for moving them may be turned upon the lever-handles, forming feeding-screws, the slitting-cutters may be arranged circumferentially between the lever-handles, and each cutter may be fitted with a separate feed-screw to advance it against the pipe.

If preferred, the implement may be constructed with a single slitting-cutter only, and in such case the parts of my invention recited in the last two claims will not be used. The use of two slitting-tools is, however, an advantage, as it enables the work to be done faster and with less aggregate labor, because the one tool forms the bearing to enable the opposite tool to bite into the metal of the pipe, and avoids the friction incident to the movement of a frictional bearing against the pipe.

If preferred, the stock may be provided with a pawl, ratchet-wheel, and swinging lever-handle in place of fixed lever-handles, so that the implement may be turned like a ratchet-drill stock.

I claim as my invention—

1. The combination, substantially as before set forth, of the stock, the leading-screw, the leading-screw collar, and the guide-collar.

2. The combination, substantially as before set forth, of the stock, the leading-screw, the leading-screw collar, the guide-collar, and the slitting-tool, constructed to move radially in the stock.

3. The combination, substantially as before set forth, of the stock, the leading-screw, the leading-screw collar, the guide-collar, the slitting-tool, and the screw for advancing the same radially.

4. The combination, substantially as before set forth, of the stock, the leading-screw, the leading-screw collar, the guide-collar, and the projections for holding the screw-die.

5. The combination, substantially as before set forth, of the stock, the leading-screw, the leading-screw collar, the guide-collar, and two slitting-tools arranged at opposite sides of the cavity of the stock 6. The combination, substantially as before set forth, of the stock, the leading-screw, the leading-screw collar, the guide-collar, two slitting-tools arranged at opposite sides of the cavity of the stock, and a feed-screw for each slitting-tool.

In witness whereof I have hereto set my hand this 19th day of September, 1878.

JAMES OTIS MORSE.

Witnesses:
  MORSE BURTIS,
  W. L. BENNEM.